United States Patent
Musto et al.

(10) Patent No.: US 9,957,810 B2
(45) Date of Patent: May 1, 2018

(54) FILM HOLE WITH PROTRUDING FLOW ACCUMULATOR

(71) Applicant: United Technologies Corporation, Hartford, CT (US)

(72) Inventors: Clifford J. Musto, West Hartford, CT (US); Nicholas M. LoRicco, Coventry, CT (US); Thomas N. Slavens, Vernon, CT (US); Timothy J. Jennings, South Windsor, CT (US); Carey Clum, East Hartford, CT (US); Sasha M. Moore, East Hartford, CT (US); John McBrien, South Glastonbury, CT (US); San Quach, East Hartford, CT (US); Christopher Whitfield, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 298 days.

(21) Appl. No.: 14/852,896

(22) Filed: Sep. 14, 2015

(65) Prior Publication Data

US 2016/0108739 A1    Apr. 21, 2016

Related U.S. Application Data (60) Provisional application No. 62/066,077, filed on Oct. 20, 2014.

(51) Int. Cl.
*F01D 25/14* (2006.01)
*F01D 5/18* (2006.01)
(Continued)

(52) U.S. Cl.
CPC .............. *F01D 5/186* (2013.01); *B22C 9/10* (2013.01); *F01D 5/187* (2013.01); *B33Y 10/00* (2014.12);
(Continued)

(58) Field of Classification Search
CPC . F01D 5/186; F01D 5/187; F01D 5/18; B22C 9/10; B33Y 80/00; B33Y 10/00;
(Continued)

(56) References Cited

U.S. PATENT DOCUMENTS 4,669,957 A * 6/1987 Phillips .................. F01D 5/186
                                                  415/115
4,684,323 A    8/1987 Field
(Continued)

FOREIGN PATENT DOCUMENTS

EP    2584148    4/2013
GB    2262314    6/1993

OTHER PUBLICATIONS

Extended European Search Report dated Mar. 18, 2016 in European Application No. 15190346.5.

*Primary Examiner* — Kenneth Bomberg
*Assistant Examiner* — Brian Delrue
(74) *Attorney, Agent, or Firm* — Snell & Wilmer, L.L.P.

(57) ABSTRACT

A wall of a gas turbine engine is provided. The wall may comprise an external surface adjacent a gas path and an internal surface adjacent an internal flow path. A film hole may have an inlet at the internal surface and an outlet at the external surface. A flow accumulator adjacent the inlet may protrude from the internal surface. A method of making an engine component is also provided and comprises the step of forming a component wall comprising an accumulator on an internal surface and a film hole defined by the component (Continued)

wall. The film hole may include an opening adjacent the accumulator and defined by the internal surface.

16 Claims, 8 Drawing Sheets

(51) Int. Cl.
*B22C 9/10* (2006.01)
*B33Y 10/00* (2015.01)
*B33Y 80/00* (2015.01)

(52) U.S. Cl.
CPC ............ *B33Y 80/00* (2014.12); *F05D 2230/21* (2013.01); *F05D 2230/22* (2013.01); *F05D 2230/31* (2013.01); *F05D 2240/127* (2013.01); *F05D 2260/202* (2013.01); *F05D 2260/2212* (2013.01); *Y02T 50/676* (2013.01)

(58) Field of Classification Search
CPC ............. F05D 2230/21; F05D 2230/22; F05D 2230/31; F05D 2240/127; F05D 2260/202; F05D 2260/2212; Y02T 50/676
USPC ....................................................... 416/97 R
See application file for complete search history.

(56) References Cited

U.S. PATENT DOCUMENTS

| | | | |
|---|---|---|---|
| 4,923,371 A * | 5/1990 | Ben-Amoz | ............. F01D 5/186 415/115 |
| 7,351,036 B2 | 4/2008 | Liang | |
| 7,866,950 B1 | 1/2011 | Wilson, Jr. | |
| 8,047,789 B1 | 11/2011 | Liang | |
| 8,057,183 B1 | 11/2011 | Liang | |
| 8,066,483 B1 | 11/2011 | Liang | |
| 8,066,484 B1 | 11/2011 | Liang | |
| 8,092,176 B2 | 1/2012 | Liang | |
| 8,096,766 B1 | 1/2012 | Downs | |
| 8,109,726 B2 | 2/2012 | Liang | |
| 8,162,609 B1 | 4/2012 | Liang | |
| 8,317,475 B1 | 11/2012 | Downs | |
| 8,322,988 B1 | 12/2012 | Downs et al. | |
| 8,672,613 B2 | 3/2014 | Bunker | |
| 2006/0002788 A1 * | 1/2006 | Liang | ...................... F01D 5/186 415/115 |
| 2007/0119832 A1 * | 5/2007 | Beck | ................. B23K 26/0608 219/121.71 |
| 2011/0311389 A1 * | 12/2011 | Ryan | .................... B22F 3/1055 419/27 |
| 2012/0087803 A1 | 4/2012 | Butler et al. | |
| 2013/0205791 A1 | 8/2013 | Mongillo, Jr. et al. | |
| 2014/0219814 A1 | 8/2014 | Heselhaus | |

* cited by examiner

FILM HOLE WITH PROTRUDING FLOW ACCUMULATOR

CROSS-REFERENCE TO RELATED APPLICATIONS

This application is a nonprovisional of, and claims priority to, and the benefit of U.S. Provisional Application No. 62/066,077, entitled "FILM HOLE WITH PROTRUDING FLOW ACCUMULATOR," filed on Oct. 20, 2014, which is hereby incorporated by reference in its entirety.

FIELD OF INVENTION

The present disclosure relates to gas turbine engines, and, more specifically, to a film hole with a protruding air flow accumulator for cooling hot components in a gas turbine engine.

BACKGROUND OF THE INVENTION

The advancement of turbomachinery performance is related to both the overall pressure ratio of the machine and the turbine inlet temperature that can be reliably sustained during operation. Increases in efficiency pressure ratio or inlet temperature typically produce a higher temperature operating environment for the turbine flow-path hardware. The working fluid in the flow path is typically several hundreds of degrees Fahrenheit higher than the melting point of the alloys that typically make up the turbine flow-path hardware. To counter the high temperature working fluid, dedicated cooling air may be extracted from the compressor and routed to cool the gas path components in the turbine, incurring significant cycle penalties.

For extremely high temperature applications, film cooling and backside convection may be utilized. Film cooling uses cooling air delivered to an internal volume of a component to emit a cooling flow over the external surface of the component. The cooling flow may form a film over the external surface of the component that reduces the local external surface temperatures downstream.

SUMMARY OF THE INVENTION

A film cooling system may comprise a wall defining a film hole, and a flow accumulator extending from the wall adjacent the film hole. The flow accumulator may be in fluid communication with the film hole.

In various embodiments, the flow accumulator may be upstream from the film hole. The flow accumulator may also be downstream from the film hole. The flow accumulator may have a shape to turbulate an air flow. A meter of the film hole may have a diameter the flow accumulator may have a height. A ratio of the height over the diameter may be less than or equal to 10. The film hole may comprise a diffuser in fluid communication with the flow accumulator. The flow accumulator may overhang an inlet of the film hole.

A turbine blade may comprise an external surface, an internal surface opposite the external surface, and a film hole. The film hole may include an inlet at the internal surface and an outlet at the external surface. A flow accumulator may protrude from the internal surface.

In various embodiments, the flow accumulator may be in fluid communication with the film hole. The flow accumulator may be upstream from the film hole or downstream from the film hole. A diffuser may be fluid communication with the flow accumulator.

A method of making an engine component is provided and comprises the step of forming a component wall comprising an accumulator on an internal surface and a film hole defined by the component wall. The film hole may include an opening adjacent the accumulator and defined by the internal surface.

In various embodiments, forming the component wall may further include additively manufacturing the component wall. Forming the component wall may be done by at least one of direct metal laser sintering, selective laser sintering, selective laser melting, electron-beam melting, or electron-beam freeform fabrication. Forming the component wall may also include the steps of forming a core of the component wall using additive manufacturing, and casting the component wall using the core. A mold may be formed as one piece with the core using additive manufacturing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, the term "downstream" in relation to a flowpath or gas path means in the direction the gas path or flowpath flows. Similarly, as used herein, the term "upstream" in relation to a flowpath or gas path means in the direction opposite the direction the gas path or flowpath flows.

Figure 1:
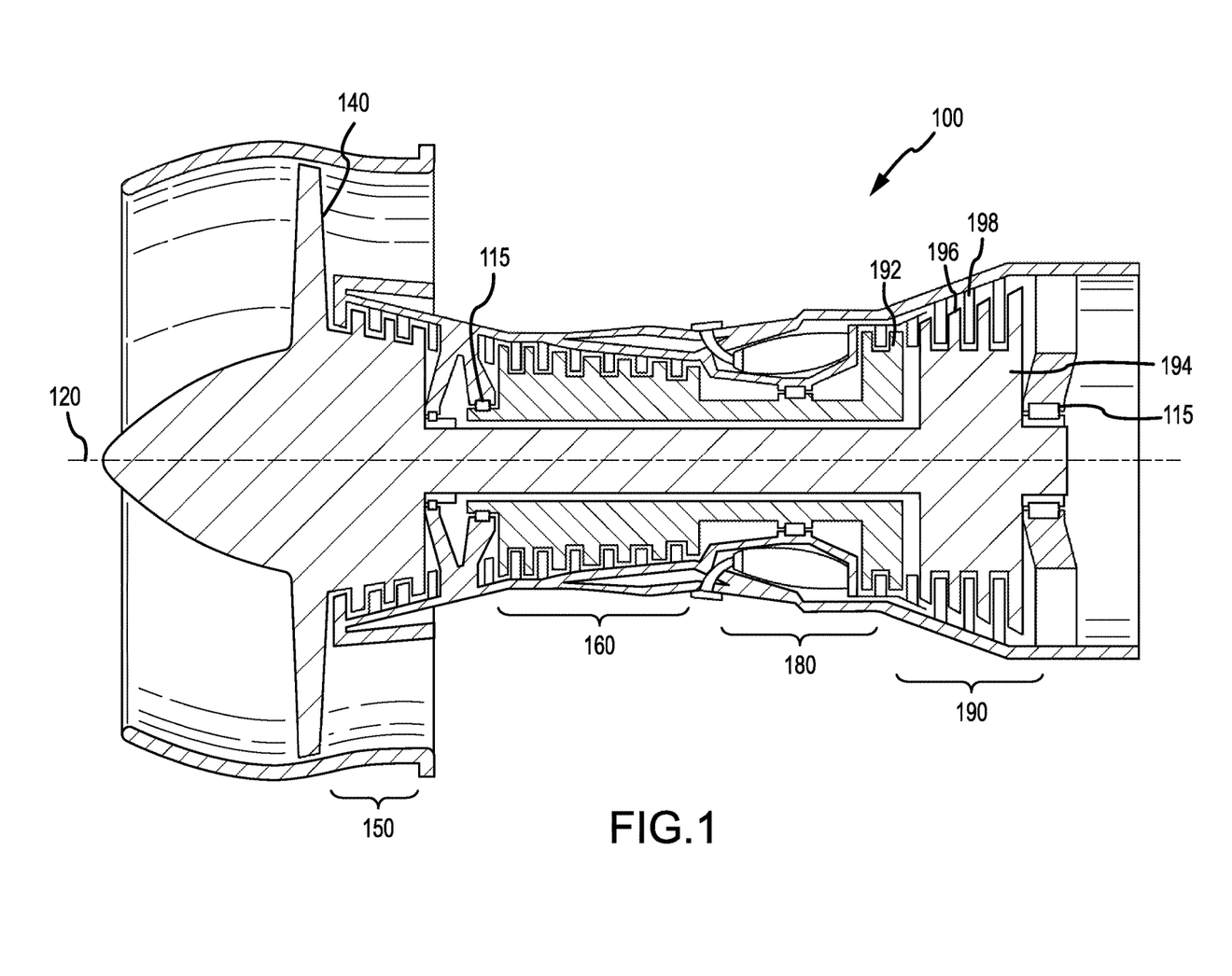
FIG. 1 illustrates an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in compressor sections 150, 160 may be mixed with fuel and burned in combustion section 180 and expanded across turbine section 190. Turbine section 190 may include high-pressure rotors 192 and low-pressure rotors 194, which rotate in response to the expansion. Turbine section 190 may comprise alternating rows of rotary airfoils or blades 196 and static airfoils or vanes 198. Air flowing through the rows of blades 196 and vanes 198 may cause vibration. A damper may be used to reduce vibration. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
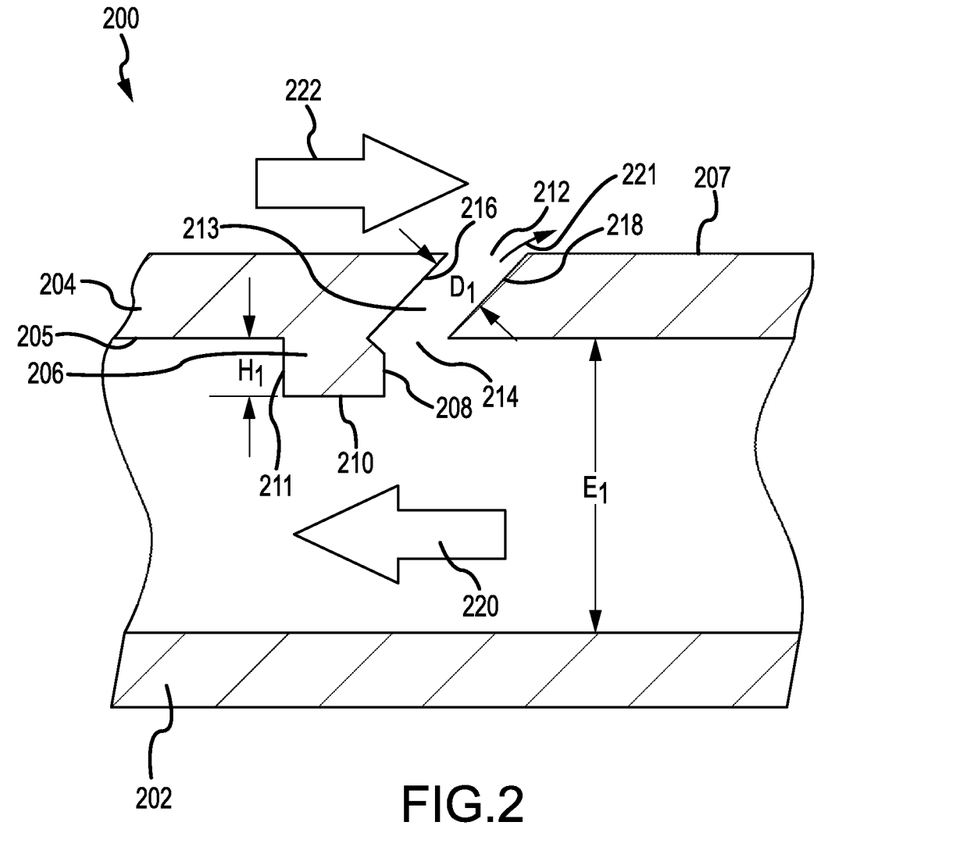
FIG. 2 illustrates an internal flow path, a gas path, and a film hole between the gas path and internal flow path, in accordance with various embodiments.

In various embodiments, and with reference to FIG. 2, a cross sectional view of film cooling system 200 is shown with an internal flow path 220, a gas path 222, and film hole 213. Internal flow path 220 may be defined by an internal surface 205 of component wall 204 and wall 202. Component wall 204 may be the wall separating the core of a turbine blade from the external surface of a turbine blade, for example. Gas path 222 may be defined by an external surface 207 of component wall 204. Film hole 213 may provide a passage between external surface 207 and internal surface 205 of component wall 204. In that regard, film hole 213 may direct cooling air from internal flow path 220 to gas path 222.

In various embodiments, film hole 213 may have inlet 214 adjacent internal flow path 220 to allow cooling air to flow from internal flow path 220 into film hole 213. Flow accumulator 206 may be downstream from inlet 214 with respect to internal flow path 220. Surface 208 of flow accumulator 206 may overhang inlet 214 and direct cooling air from internal flow path 220 into film hole 213 using total or ram pressure. Total or ram pressure is pressure exerted on a moving fluid contacting a stationary body as a result of a velocity differential between the moving fluid and a stationary body. In that regard, flow accumulator 206 may use ram pressure to increase the velocity and volume of cooling air flowing from internal flow path 220 into film hole 213. Surface 210 of flow accumulator 206 may be adjacent surface 208. Surface 210 of flow accumulator 206 may extend along internal flow path 220 to surface 211 of flow accumulator 206, which may extend in a radial direction to internal surface 205 of component wall 204. Surface 210 may be substantially planar.

In various embodiments, flow accumulator 206 may have a height H1 from internal surface 205. Film hole 213 may comprise a hydraulic diameter D1 from sidewall 216 to sidewall 218. Hydraulic diameter is defined as 4A/P, where A is the cross sectional area and P is the wetted perimeter around the cross sectional area. In various embodiments, the ratio of H1/D1 is greater than or equal to 0.1 and less than or equal to ten (10). Flow accumulator 206, wall 204, and sidewalls 216 and 218 defining film hole 213 may be made of a high performance nickel-based superalloy (e.g., various nickel alloys available under the trade name INCONEL). Flow accumulator 206 may be made using additive processes so that flow accumulator 206 may be accurately aligned with film hole 213. In various embodiments, flow accumulator 206 is integral to wall 204 in that flow accumulator 206 and wall 204 may be made from the same material at the same time by casting, for example.

In various embodiments, internal flow path 220 may have a hydraulic diameter E1. Film hole 213 may open to gas path 222 at outlet 212 defined by external surface 207. The size and shape of flow accumulator 206 may be selected so flow accumulator 312 functions as a turbulator in internal flow path 220. In that regard, internal cooling based on convection may be improved by introducing turbulence to internal flow path 220. Cooling air 221 exiting film hole 213 may move along external surface 207 adjacent sidewall 218 and limit the heating effect of hot gas in gas path 222 on external surface 207. Flow accumulator 206 may increase the efficacy of film hole 213 at providing a protective film of cooling air over external surface 207 by increasing the velocity of cooling air exiting film hole 213.

In various embodiments, additive manufacturing (i.e., 3D printing) may be utilized to make film hole 213 and ensure inlet 214 is aligned adjacent to accumulator 206 since there is no line-of-sight to internal features of various engine parts (e.g., an air foil for use in a turbine or compressor) such as accumulator 206. For example, a die-less core may be additively manufactured to accurately align film hole 213 and accumulator 206. An additively manufactured core enables cast-in cooling holes to be precisely located relative to accumulator 206. Thus, a core for casting a gas turbine engine part may be additively manufactured to achieve a cast-in cooling hole design while maintaining the benefits of single crystal materials. In various embodiments, the part may be directly constructed additively through a process such as direct metal laser sintering (DMLS), selective laser sintering (SLS), selective laser melting (SLM), electron-beam melting (EBM), or electron-beam freeform fabrication (EBF$^3$). In that regard, additively manufacturing a part (or the core to cast the part) may enable precisely locating the film hole relative to the face of the accumulator.

Figure 3A:
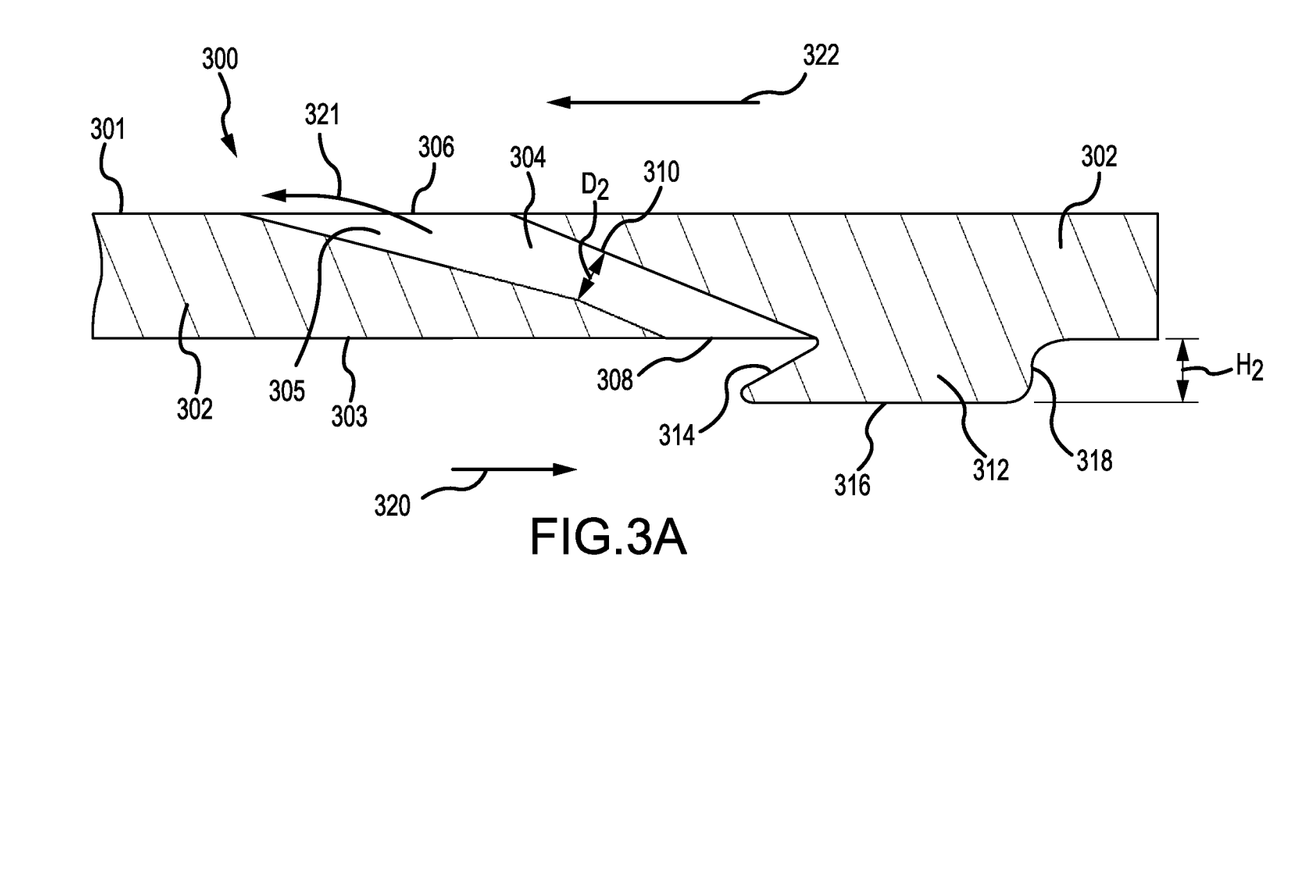
FIG. 3A illustrates a cross section of a film hole with a flow accumulator to manage air flow, in accordance with various embodiments.
Figure 3B:
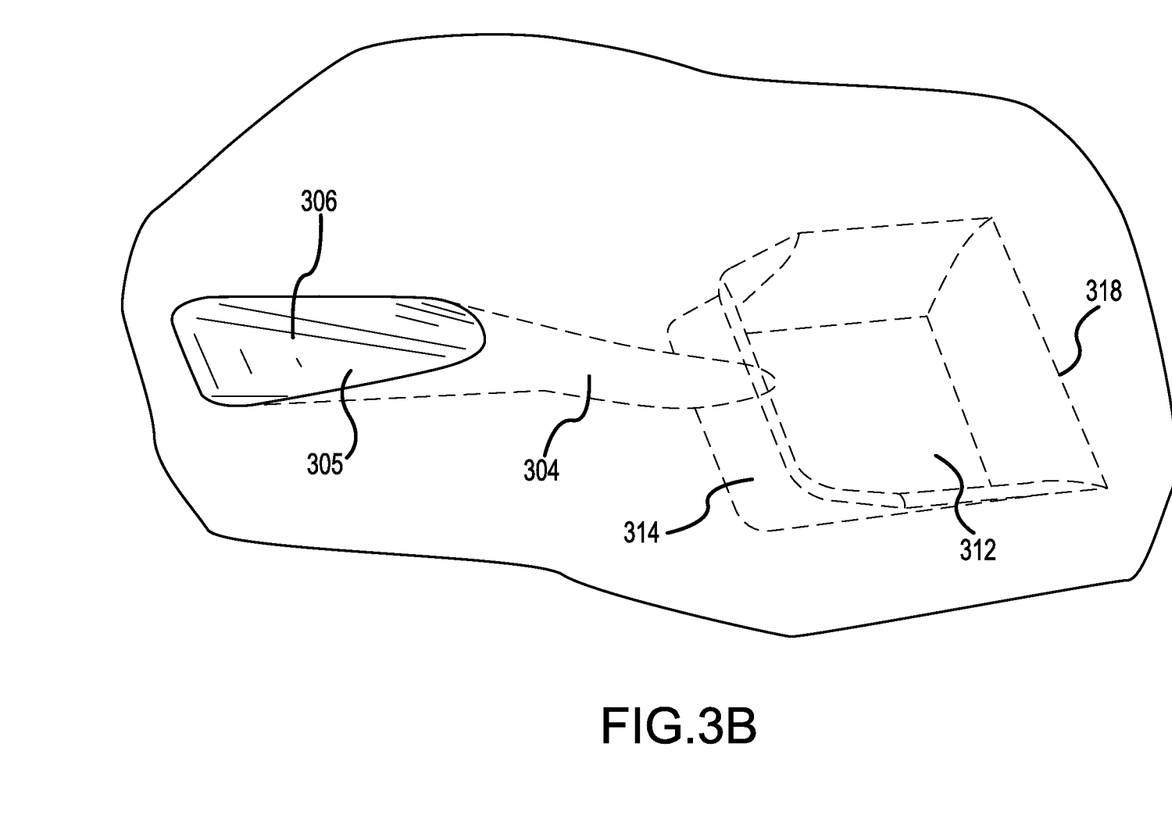
FIG. 3B illustrates a three-dimensional film hole with a flow accumulator to manage air as viewed from the gas path, in accordance with various embodiments.
Figure 3C:
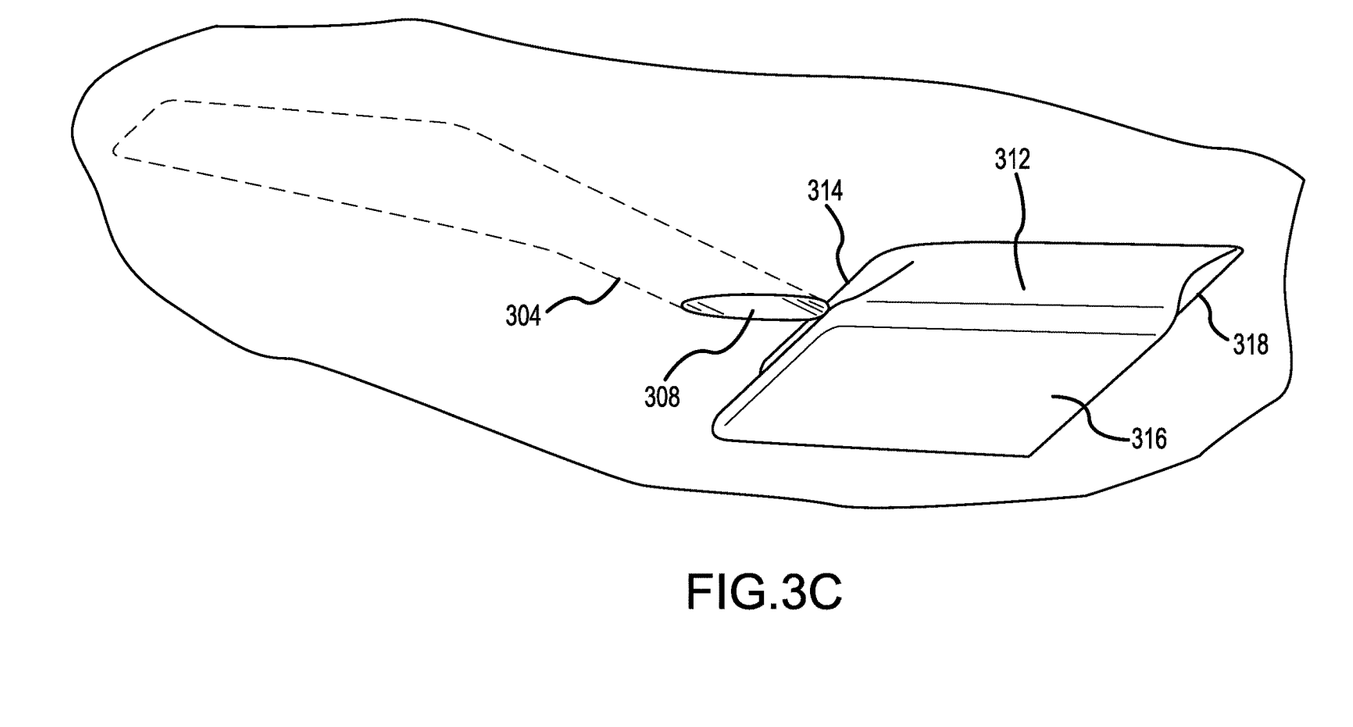
FIG. 3C illustrates a three-dimensional film hole with a flow accumulator to manage air as viewed from the internal flow path, in accordance with various embodiments.

In various embodiments, and with reference to FIGS. 3A-3C, a film hole 304 with flow accumulator 312 is shown. Film cooled component 300 includes a wall 302. Wall 302 has external surface 301 and internal surface 303. Inlet 308 of film hole 304 may be coplanar with internal surface 303. Film hole 304 may extend from inlet 308 to meter 310 of film hole 305. Meter 310 may have a limiting flow point in film hole 304 and may have hydraulic diameter D2. After meter 310, film hole 304 may transition into diffuser 305 to create a smooth film of cooling air exiting from outlet 306 over external surface 301.

In various embodiments, flow accumulator 312 extends from internal surface 303 at an end of inlet 308. Surface 314 of flow accumulator 312 may direct air from internal flow path 320 through inlet 308 into film hole 304 using total or ram pressure. Total or ram pressure is pressure exerted on a moving fluid contacting a stationary body as a result of a velocity differential between the moving fluid and a stationary body. In that regard, flow accumulator 312 may use ram pressure to increase the velocity and volume of cooling air 321 flowing through film hole 304 and into gas path 322. Flow accumulator 312 may include surface 316 substantially parallel to internal surface 303. Surface 316 may extend from surface 314 to surface 318. Surface 318 may extend from surface 316 to internal surface 303 with height H2. In various embodiments, the ratio of H2/D2 is greater than or equal to 0.1 and less than or equal to ten (10). The contour of surface 318 may be selected to provide turbulent air flow over internal surface 303 downstream from flow accumulator 312. Height H2 of flow accumulator 312 may be less than a width or length of flow accumulator 312. Flow accumulator 312 may increase a velocity of a cooling flow through film hole 304 by conditioning a flow of the coolant adjacent to the inlet 308.

In various embodiments, outlet 306 of diffuser 305 may have an elongated trapezoidal shape. Inlet 308 of film hole 304 may have a width narrower than the width of flow accumulator 312 adjacent film hole 304. Flow accumulator 312 may have a rectangular, square shape, circular, or irregular shape to increase air flow rate into inlet 308 of film hole 304. Flow accumulator 312 may improve the pressure contour of cooling air flowing through film hole 304 by directing cooling air flow through inlet 308 into film hole 304 and increasing the velocity of the cooling air flow. Flow accumulator 312 may also improve the flow length of a cooling film exiting diffuser 305 through outlet 306 and forming over external surface 301.

In various embodiments, internal features such as flow accumulator 312 may be additively manufactured to ensure inlet 308 of film hole 304 is aligned adjacent to surface 314 of flow accumulator 312. For example, a sand core may be additively manufactured with features of the core defining film hole 304 and flow accumulator 312. A part may then be cast using the core to accurately align film hole 304 and flow accumulator 312. The additively manufactured core provides high resolution to form cast-in film hole 304 precisely located relative to flow accumulator 312. Thus, a core for casting a gas turbine engine part may be additively manufactured to achieve a cast-in cooling hole design. In various embodiments, a part (e.g., and air foil for use in a turbine or compressor) may be directly constructed additively through a process such as DMLS, SLS, SLM, EBM, or EBF$^3$. In that regard, additively manufacturing a part (or a core to cast the part) may precisely locate a film hole relative to an accumulator.

Figure 4:
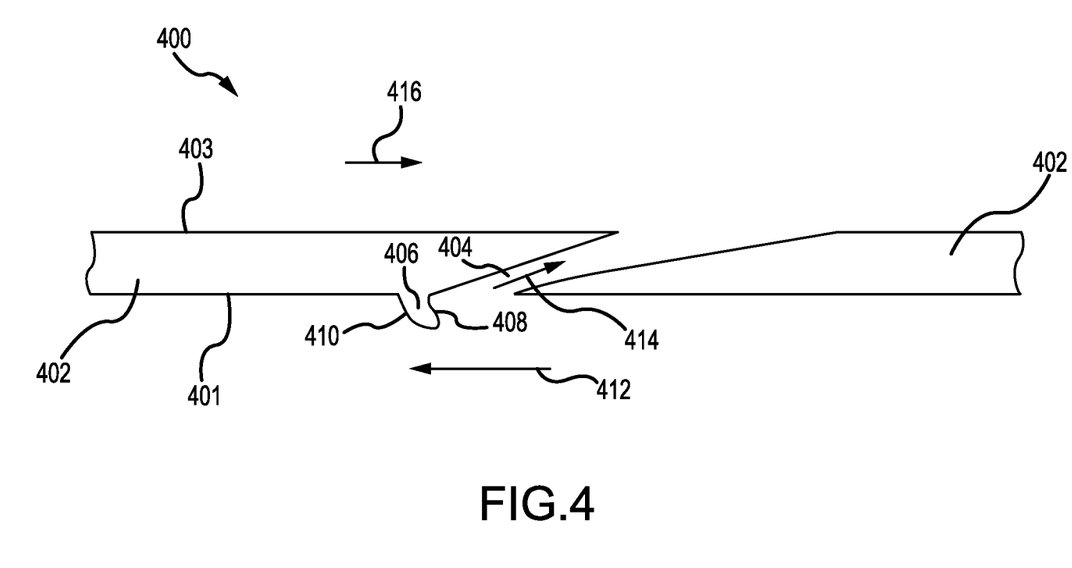
FIG. 4 illustrates a film hole with a narrow flow accumulator downstream from the film hole for directing internal flow, in accordance with various embodiments.

In various embodiments, and with reference to FIG. 4, film cooling system 400 is shown with an internal flow path 412, a gas path 416, and a film hole 404 between gas path 416 and internal flow path 412. Film cooling system 400 may comprise component wall 402 with an internal surface 401 and an external surface 403. Internal flow path 412 may flow along internal surface 401. Gas path 416 may flow over external surface 403. Film hole 404 may form a passage from internal surface 401 to external surface 403. In that regard, film hole 404 may direct a film flow 414 from internal flow path 412 to gas path 416. Flow accumulator 406 may be disposed downstream from film hole 404 to direct film flow 414 into film hole 404 using total or ram pressure.

Figure 5:
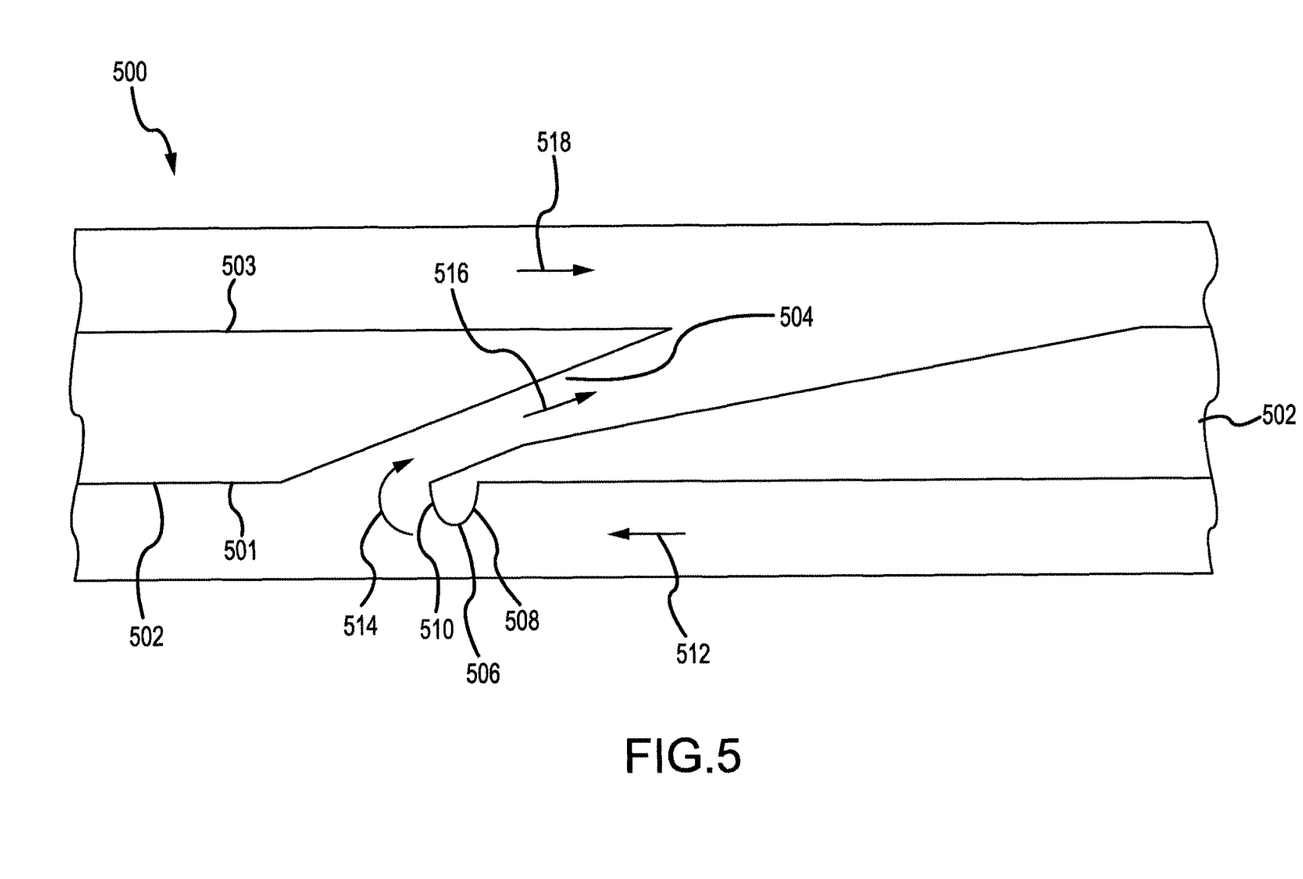
FIG. 5 illustrates a film hole with a flow accumulator upstream from the film hole for directing internal flow, in accordance with various embodiments.

In various embodiments, and with reference to FIG. 5, film cooling system 500 is shown with an internal flow path 512, a gas path 518, and a film hole 504 between gas path 518 and internal flow path 512. Film cooling system 500 may comprise component wall 502 comprising an internal surface 501 and an external surface 503. Internal flow path 512 may flow along internal surface 501. Gas path 518 may flow over external surface 503. Film hole 504 may form a passage from internal surface 501 to external surface 503. In that regard, film hole 504 may direct a film flow 516 from internal flow path 512 to gas path 518. Flow accumulator 506 may be upstream from film hole 504. Upstream flow accumulator may act as an air foil and cause cooling flow 514 to bend around flow accumulator 506 and into film hole 504.

Figure 6:
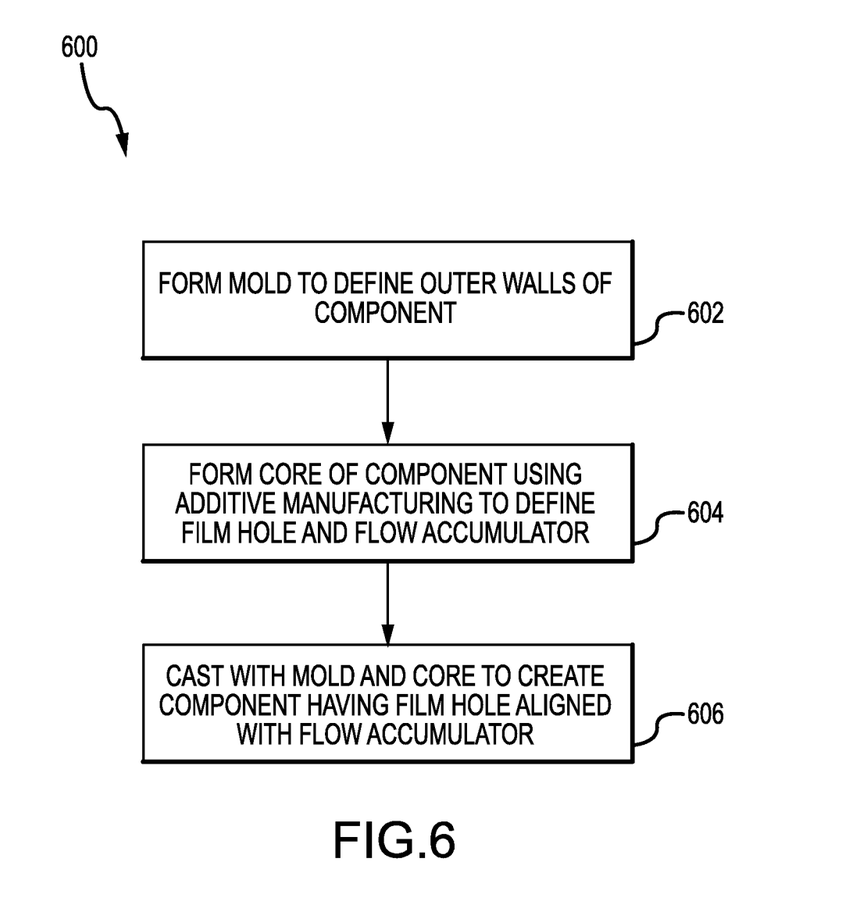
FIG. 6 illustrates a flow chart of an exemplary method for making a part having a film hole aligned with an accumulator, in accordance with various embodiments.

In various embodiments, and with reference to FIG. 6, an exemplary method 600 of making a component having a film hole and flow accumulator is shown. A mold is formed to define outer walls of the component (Step 602). A core of the component is formed using additive manufacturing to define a film hole and flow accumulator (Step 604). The film hole and flow accumulator may be aligned by using additive manufacturing to create the core. A component having a film hole aligned with a flow accumulator is cast with the mold and core (Step 606). In that regard, a high performance nickel-based superalloy (e.g., various nickel alloys available under the trade name INCONEL) may be poured into the mold and core in molten form to yield a single crystal structure. In various embodiments, the component may be cast using the core alone. Thus, a component wall is formed with a flow accumulator on an internal surface and a film hole defined by the component wall. An opening of the film hole may be aligned adjacent the flow accumulator so that the film hole is in fluid communication with the flow accumulator.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine component, comprising:
    an internal flow path defined by an internal surface and extending from an upstream direction to a downstream direction;
    a component wall including a film hole comprising:
        an inlet defined by the internal surface,
        an outlet defined by an external surface, wherein the film hole extends from the inlet at least partially in the upstream direction,
    a flow accumulator extending from the component wall adjacent the inlet, wherein the flow accumulator is configured to direct fluid into the inlet, through the film hole, and through the outlet, wherein the flow accumulator is at least partially defined by a first surface extending from a sidewall of the film hole in the upstream direction, wherein the first surface is spaced from, faces, and at least partially overlaps the inlet in the upstream direction.

2. The gas turbine engine component of claim 1, wherein the flow accumulator comprises a shape configured to turbulate an air flow.

3. The gas turbine engine component of claim 1, further comprising:
    a meter of the film hole comprising a hydraulic diameter; and
    a height of the flow accumulator, wherein a ratio of the height over the hydraulic diameter is less than or equal to 10.

4. The gas turbine engine component of claim 1, wherein the film hole comprises a diffuser in fluid communication with the flow accumulator.

5. The gas turbine engine component of claim 1, wherein the flow accumulator overhangs the inlet.

6. The gas turbine engine component of claim 1, wherein the flow accumulator is configured to increase a velocity of a coolant through the film hole by conditioning a flow of the coolant adjacent to the inlet.

7. A gas turbine engine part, comprising:
    an internal flow path defined by an internal surface and extending from an upstream direction to a downstream direction;
    an external surface defining an outlet;
    an internal surface opposite the external surface and defining an inlet;
    a film hole extending from the inlet to the outlet at least partially in the upstream direction; and
    a flow accumulator protruding from the internal surface and partially bounding the film hole, wherein the flow accumulator is at least partially defined by a first surface extending from a sidewall of the film hole in the upstream direction, wherein the first surface is spaced from, faces, and at least partially overlaps the inlet in the upstream direction.

8. The gas turbine engine part of claim 7, wherein the flow accumulator is in fluid communication with the film hole.

9. The gas turbine engine part of claim 7, wherein the film hole further comprises a diffuser in fluid communication with the flow accumulator.

10. The gas turbine engine part of claim 7, further comprising:
    a meter of the film hole comprising a hydraulic diameter; and
    a height of the flow accumulator, wherein a ratio of the height over the hydraulic diameter is less than or equal to 10.

11. The gas turbine engine part of claim 7, wherein the flow accumulator overhangs the inlet of the film hole.

12. A method of making an engine component, comprising:
    forming a component comprising an accumulator on an internal surface and a film hole aligned with the accumulator, the film hole comprising an opening adjacent the accumulator and defined by the internal surface, wherein the accumulator is configured to direct fluid into the opening, wherein the accumulator is at least partially defined by a first surface extending from a sidewall of the film hole in the upstream direction, wherein the first surface is spaced from, faces, and at least partially overlaps the opening in the upstream direction.

13. The method of claim 12, wherein the forming the component wall further comprises additively manufacturing the component wall.

14. The method of claim 12, further forming the component wall by at least one of direct metal laser sintering, selective laser sintering, selective laser melting, electron-beam melting, or electron-beam freeform fabrication.

15. The method of claim 12, wherein the forming the component wall further comprises:
    forming a core of the component wall using additive manufacturing; and
    casting the component wall using the core.

16. The method of claim 15, further comprising forming a mold as one piece with the core using additive manufacturing.

\* \* \* \* \*